(12) United States Patent
Nagata

(10) Patent No.: US 12,337,391 B2
(45) Date of Patent: Jun. 24, 2025

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Ayumi Nagata, Saitama (JP)

(73) Assignee: KYOCERA CORPORATION, Kyoto (JP)

( * ) Notice: Subject to any disclaimer, the term of this patent is extended or adjusted under 35 U.S.C. 154(b) by 424 days.

(21) Appl. No.: 17/998,671

(22) PCT Filed: May 26, 2021

(86) PCT No.: PCT/JP2021/019951
§ 371 (c)(1),
(2) Date: Nov. 14, 2022

(87) PCT Pub. No.: WO2021/241623
PCT Pub. Date: Dec. 2, 2021

(65) Prior Publication Data
US 2023/0347418 A1  Nov. 2, 2023

(30) Foreign Application Priority Data
May 26, 2020 (JP) ................. 2020-091489

(51) Int. Cl.
  *B23B 27/16* (2006.01)
  *B23B 1/00* (2006.01)
(52) U.S. Cl.
  CPC ........... *B23B 27/16* (2013.01); *B23B 1/00* (2013.01); *B23B 2200/0447* (2013.01); *B23B 2200/085* (2013.01)

(58) Field of Classification Search
CPC ........... B23B 27/16; B23B 2200/0447; B23B 2200/0433; B23B 2200/083; B23B 2200/085; B23B 27/141; B23B 1/00
See application file for complete search history.

(56) References Cited

U.S. PATENT DOCUMENTS 5,634,745 A * 6/1997 Wiman ................. B23B 27/141
                                                         407/120
7,931,426 B2 * 4/2011 Lof ....................... B23B 27/145
                                                         407/115
9,346,102 B2 * 5/2016 Selin ..................... B23B 27/005
(Continued)

FOREIGN PATENT DOCUMENTS

JP  2000107911 A  4/2000
JP  2019517930 A  6/2019

*Primary Examiner* — Sara Addisu
(74) *Attorney, Agent, or Firm* — HAUPTMAN HAM, LLP

(57) ABSTRACT

A cutting insert may include an upper surface, a lower surface, a lateral surface and a cutting edge. The upper surface may include a first corner, a first side, a second side and a rake surface. The cutting edge may include a first cutting edge located on the first corner, and a second cutting edge located on the first side. The first cutting edge may include a first part. The first part may be located between a midportion of the first corner and the first side, and may come closer to a reference plane as going away from the first side. The rake surface may include a first region located along the first part. A rake angle in the first region may become smaller as coming closer to the midportion of the first corner.

19 Claims, 18 Drawing Sheets

(56) References Cited

U.S. PATENT DOCUMENTS

| | | | |
|---|---|---|---|
| 12,030,128 B2* | 7/2024 | Kanbara | B23C 5/202 |
| 2002/0127068 A1* | 9/2002 | Kinukawa | B23B 27/145 |
| | | | 407/113 |
| 2006/0188347 A1* | 8/2006 | Kratz | B23B 27/145 |
| | | | 407/113 |
| 2006/0228179 A1* | 10/2006 | Alm | B23B 27/145 |
| | | | 407/119 |
| 2013/0236257 A1* | 9/2013 | Nada | B23B 27/1607 |
| | | | 407/114 |
| 2016/0361767 A1* | 12/2016 | Ikeda | B23B 27/145 |
| 2017/0209935 A1* | 7/2017 | Furusawa | B23B 27/045 |
| 2019/0039146 A1* | 2/2019 | Bar Hen | B23B 27/145 |
| 2019/0039152 A1* | 2/2019 | Ikeda | B23B 27/143 |
| 2019/0247929 A1* | 8/2019 | Pecina | B23B 27/141 |
| 2021/0086269 A1* | 3/2021 | Maeno | B23B 27/143 |
| 2022/0347762 A1* | 11/2022 | Ida | B23B 27/1611 |
| 2022/0347768 A1* | 11/2022 | Sasaki | B23C 5/109 |

\* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/019951 filed on May 26, 2021, which claims priority to Japanese Application No. 2020-091489 filed May 26, 2020. The contents of the application are incorporated herein by reference in its entirety.

TECHNICAL FIELD

The present disclosure may generally relate to cutting inserts used in a cutting process of a workpiece. Examples of the cutting process may include milling process and turning process. Examples of the turning process may include external diameter machining, internal diameter machining and end face machining.

BACKGROUND

Examples of a cutting insert used in a cutting process of a workpiece may include a cutting insert discussed in Japanese Unexamined Patent Publication No. 2000-107911 (Patent Document 1) and a cutting insert discussed in Japanese Unexamined Patent Publication No. 2019-517930 (Patent Document 2). Both of the cutting inserts respectively discussed in Patent Documents 1 and 2 may have an upper surface including an acute angle corner. Various values are settable as an internal angle of the acute angle corner.

If the internal angle of the acute angle corner has a small value (for example, approximately 30°), durability of the acute angle corner may decrease. It may therefore be necessary to carry out controls, such as decreasing feed rate, in the cutting process. However, it may also be necessary to increase feed rate in order to achieve high efficiency of the cutting process. That is, improved durability of the acute angle corner has been indispensable to the high efficiency of the cutting process.

SUMMARY

A cutting insert in a non-limiting embodiment of the present disclosure may include an upper surface, a lower surface, a lateral surface and a cutting edge. The upper surface may include a first corner having a convex curvilinear shape, and a first side and a second side each connecting to the first corner. The lower surface may be located on a side opposite to the upper surface. The lateral surface may be located between the upper surface and the lower surface. The cutting edge may be located on an intersection of the upper surface and the lateral surface. An imaginary straight line passing through a center of the upper surface and a center of the lower surface may be a central axis. An imaginary plane which is located between the upper surface and the lower surface and is orthogonal to the central may be a reference plane. The cutting edge may include a first cutting edge located on the first corner, and a second cutting edge located on the first side. The first cutting edge may include a first part. The first part may be located between a midportion of the first corner and the first side, and may come closer to the reference plane as going away from the first side. The upper surface may further include a rake surface located along the cutting edge. The rake surface may include a first region located along the first part. A rake angle in the first region may become smaller as coming closer to the midportion of the first corner.

EMBODIMENTS

Figure 1:
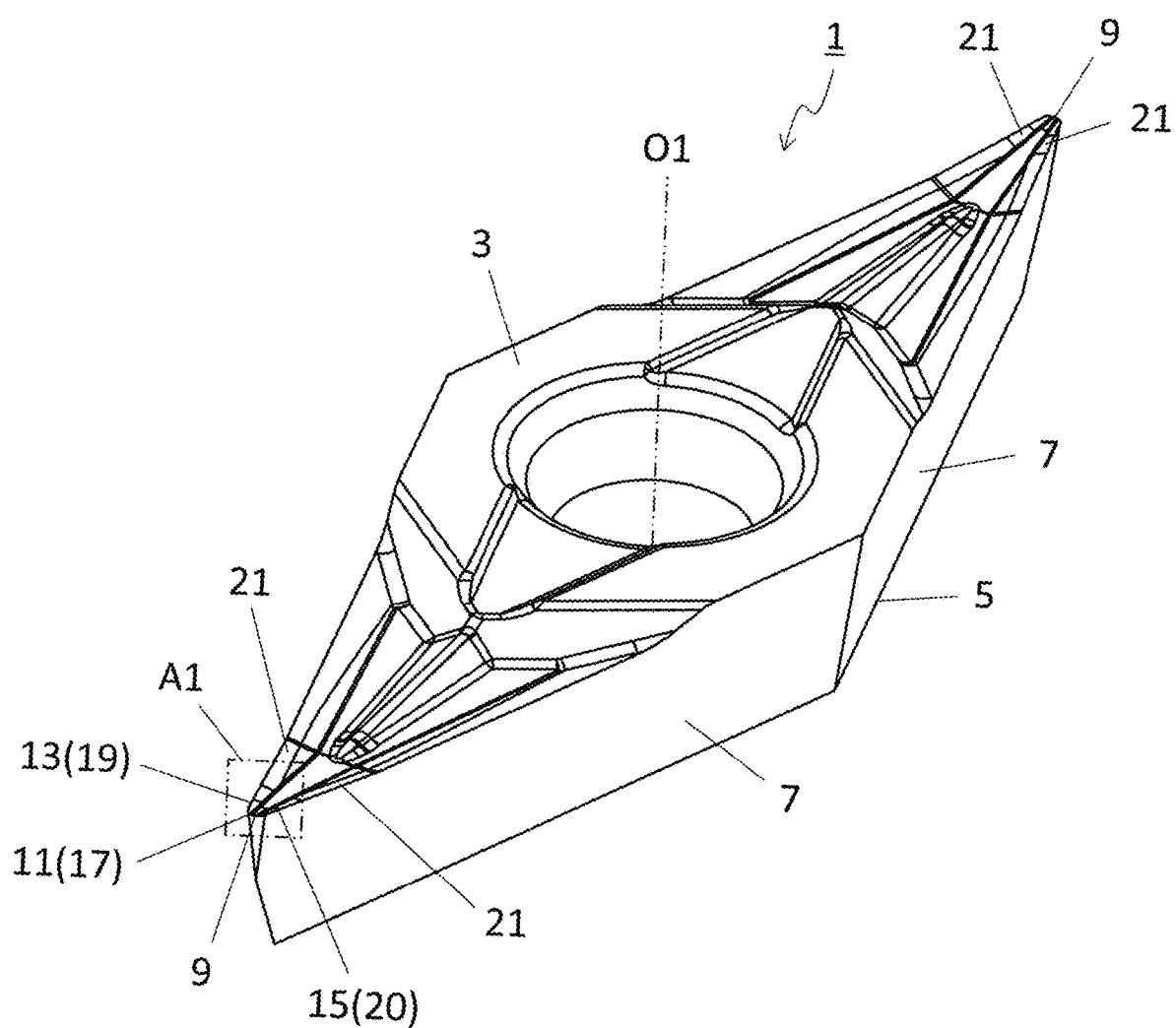
FIG. 1 is a perspective view illustrating a cutting insert in a non-limiting embodiment.

A cutting insert 1 (hereinafter also referred to simply as "insert 1") in a non-limiting embodiment of the present disclosure may be described in detail below with reference to the drawings. For the sake of description, the drawings referred to in the following may illustrate, in simplified form, only main members necessary for describing the non-limiting embodiment. The insert 1 may therefore include any arbitrary structural member not illustrated in the drawings referred to. Dimensions of the members in each of the drawings faithfully represent neither dimensions of actual structural members nor dimensional ratios of these members.

<Cutting Inserts>

The insert 1 may include an upper surface 3, a lower surface 5, a lateral surface 7 and a cutting edge 9 as in a non-limiting embodiment illustrated in FIG. 1.

Figure 3:
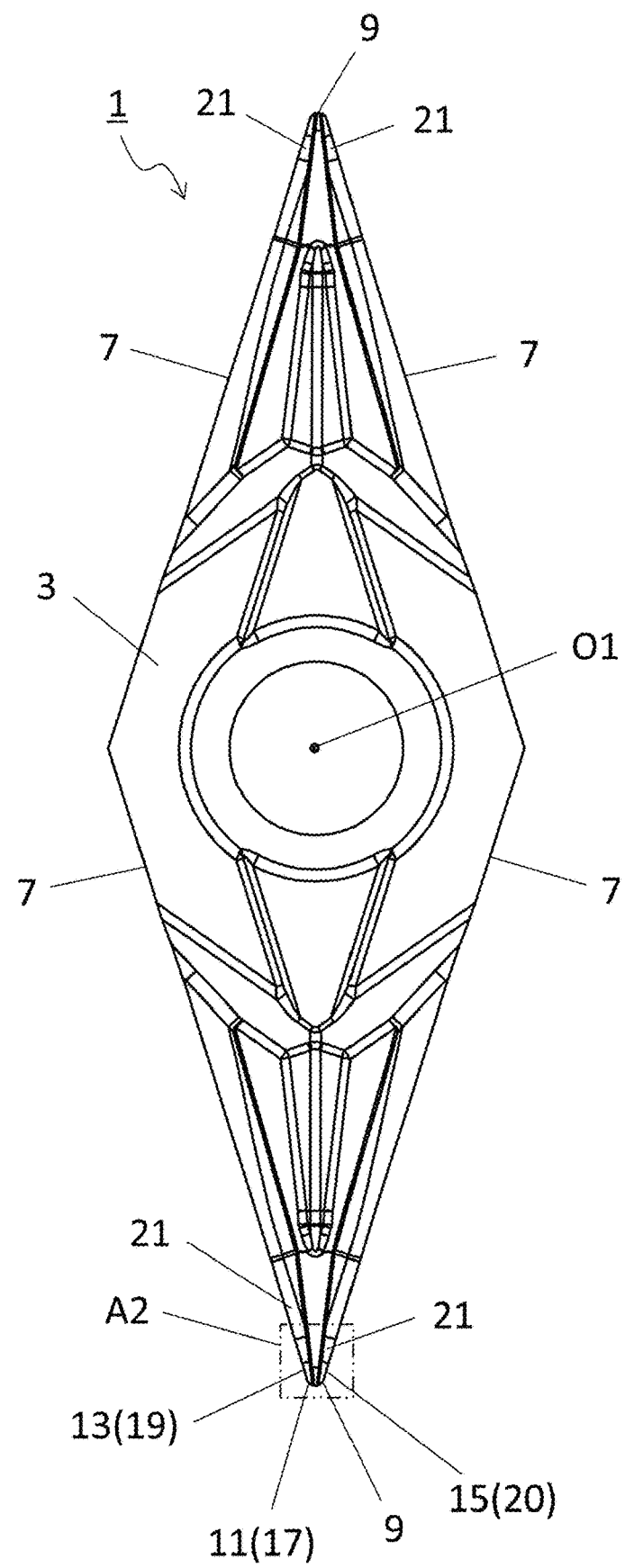
FIG. 3 is a plan view of an upper surface of the cutting insert illustrated in FIG. 1 as viewed from the front.

The upper surface 3 may have a polygonal shape. The upper surface 3 may have a quadrangular shape as in a non-limiting embodiment illustrated in FIG. 3. The upper surface 3 may include a plurality of corners and a plurality of sides. The upper surface 3 may include four corners and four sides as in the non-limiting embodiment illustrated in FIG. 3.

One of the plurality of corners may be a first corner 11. An internal angle of the first corner 11 of the upper surface 3 is viewed from the front may be an acute angle. A front view of the upper surface 3 may be rephrased as a top view thereof. The magnitude of the first corner 11 is not limited to a specific value. For example, the first corner 11 is settable to 20-85°. Particularly, the first corner 11 is settable to a value as small as 20-40°.

Two sides extending from the first corner 11 among the plurality of sides may be a first side 13 and a second side 15. That is, the upper surface 3 may include the first corner 11, and the first side 13 and the second side 15 each connecting to the first corner 11. The upper surface 3 is not limited to the quadrangular shape. There is no problem if the upper surface 3 has, for example, a triangular shape, pentagonal shape, or hexagonal shape.

The above polygonal shape is not limited to a strict polygonal shape. As in a non-limiting embodiment illustrated in FIG. 4, the individual corners may have a rounded shape, in other words, a curvilinear shape protruding outward in a top view. The shape of each of the four sides is not limited to a strict straight line shape in a top view. For example, the individual four sides may have a shape slightly protruding outward, or a slightly concave shape.

In cases where a corner has a rounded shape, an intersecting angle of two imaginary straight lines obtained by individually extending two sides that interpose the corner therebetween in a top view may be regarded as an internal angle. For example, if the first corner 11 has a rounded shape, an intersecting angle of two imaginary straight lines obtained by individually extending the first side 13 and the second side 15 in a top view may be an internal angle. If the above two sides do not have a straight line shape, tangents at end parts in contact with the corner on these two sides may be regarded as the above imaginary straight lines.

The lower surface 5 may be located on a side opposite to the upper surface 3. The lower surface 5 may have the same shape as the upper surface 3, or alternatively may have a different shape from the upper surface 3. Similarly to the upper surface 3, the lower surface 5 may have a polygonal shape. If the upper surface 3 and the lower surface 5 individually have the polygonal shape, the lower surface 5 may have a similar shape to the upper surface 3.

For example, the lower surface 5 may have a shape slightly smaller than the upper surface 3. The lower surface 5 may be parallel to or inclined with respect to the upper surface 3. The lower surface 5 may serve as a contact surface brought into contact with a holder when attaching the insert 1 to the holder.

The lateral surface 7 may be located between the upper surface 3 and the lower surface 5. The lateral surface 7 may connect to the upper surface 3, or alternatively may be located away from the upper surface 3. The lateral surface 7 may connect to the lower surface 5, or alternatively may be located away from the lower surface 5. If a corner of the upper surface 3 have a rounded shape, a part of the lateral surface 7 which connects to the corner may have a convex curved surface shape. If a side of the upper surface 3 has the straight line shape, a part of the lateral surface 7 which connects to the side may have a flat surface shape.

For example, in cases where the upper surface 3 includes four rounded corners and four straight line shaped sides, the lateral surface 7 may include four convex curved surface regions and four flat regions. The term "flat" means not being a curved surface in the present disclosure. That is, the term "flat" is not necessarily limited to being parallel or horizontal to the upper surface 3.

The term "flat" need not be a strict plane in the present disclosure. Almost inevitable unevenness may be permitted in manufacturing of the insert 1. Specifically, unevenness having surface roughness of approximately 0.5 μm may be included.

Figure 5:
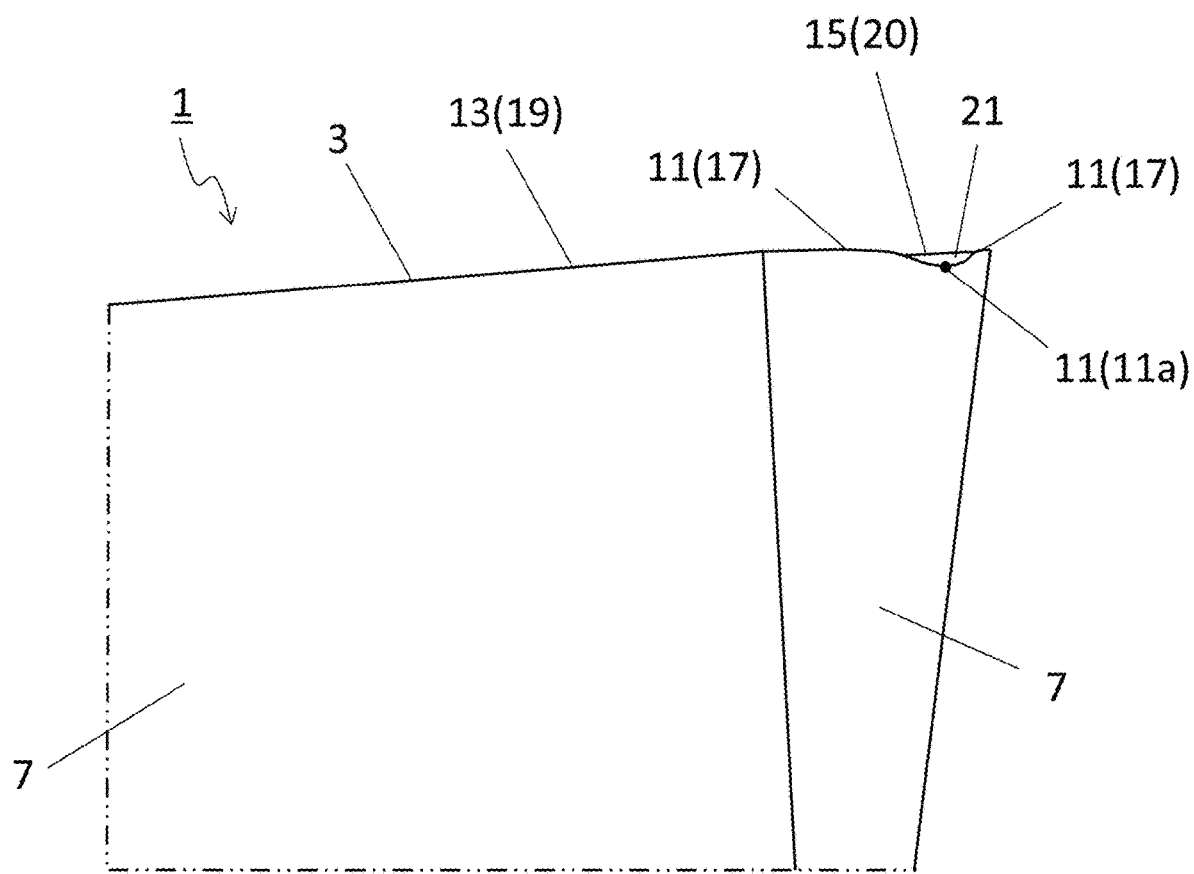
FIG. 5 is a side view of the cutting insert illustrated in FIG. 4 as viewed from a B1 direction.

The lateral surface 7 may extend in a direction orthogonal to the upper surface 3 and the lower surface 5, or alternatively may be inclined with respect to the upper surface 3 and the lower surface 5. For example, if the lower surface 5 has a shape slightly smaller than the upper surface 3, the lateral surface 7 may be inclined so as to come closer to a central axis O1 as going away from the upper surface 3 so as to come closer to the lower surface 5, as in a non-limiting embodiment illustrated in FIGS. 5 to 7. An imaginary straight line passing through a center of the upper surface 3 and a center of the lower surface 5 may be the central axis O1.

The cutting edge 9 may be located on an intersection of the upper surface 3 and the lateral surface 7. In other words, the cutting edge 9 may be located on an outer peripheral edge of the upper surface 3. The cutting edge 9 may be used for cutting out a workpiece if a cutting process of the workpiece is carried out to manufacture a machined product. The cutting edge 9 may be located on the whole or a part of the intersection of the upper surface 3 and the lateral surface 7.

Figure 2:
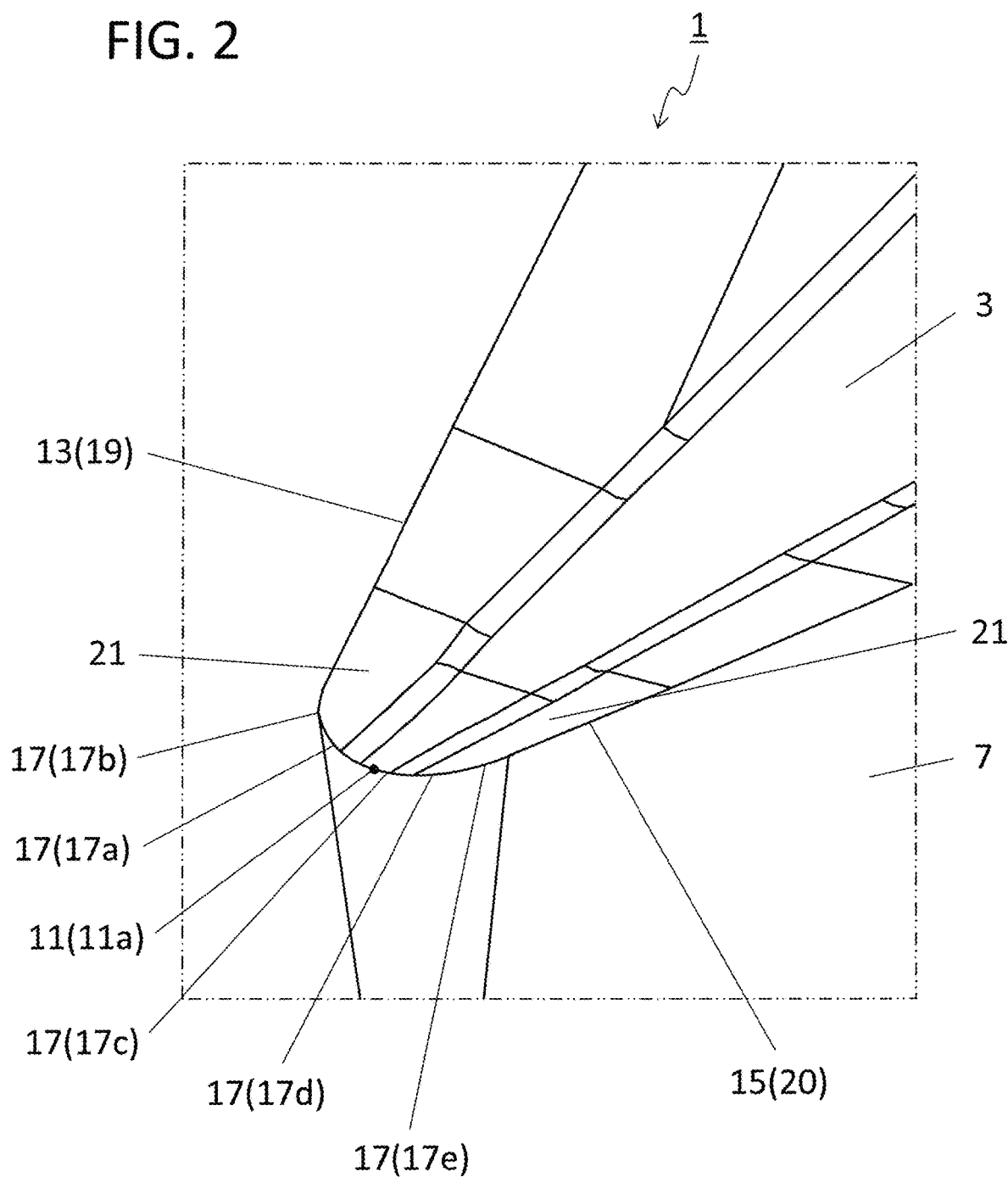
FIG. 2 is an enlarged view of a region A1 illustrated in FIG. 1.

The cutting edge 9 may include a first cutting edge 17 located on the first corner 11, and a second cutting edge 19 located on the first side 13 as in the non-limiting embodiment illustrated in FIG. 2. The cutting edge 9 may further include a third cutting edge 20 located on the second side 15. If the first corner 11 has the rounded shape, the first cutting edge 17 may have a convex curvilinear shape. If the first side 13 has a straight line shape, the second cutting edge 19 may have a straight line shape.

A part of the intersection of the upper surface 3 and the lateral surface 7 on which the cutting edge 9 is located may be subjected to a so-called honing process. That is, the intersection of the upper surface 3 and the lateral surface 7 may not be strict line shape formed by intersection of two surfaces. If the intersection is not a strict line shape but is subjected to the honing process, durability of the cutting edge 9 can be enhanced. For example, the part where the cutting edge 9 is located on the intersection of the upper surface 3 and the lateral surface 7 may be subjected to round honing process so as to have a curved surface shape.

Figure 6:
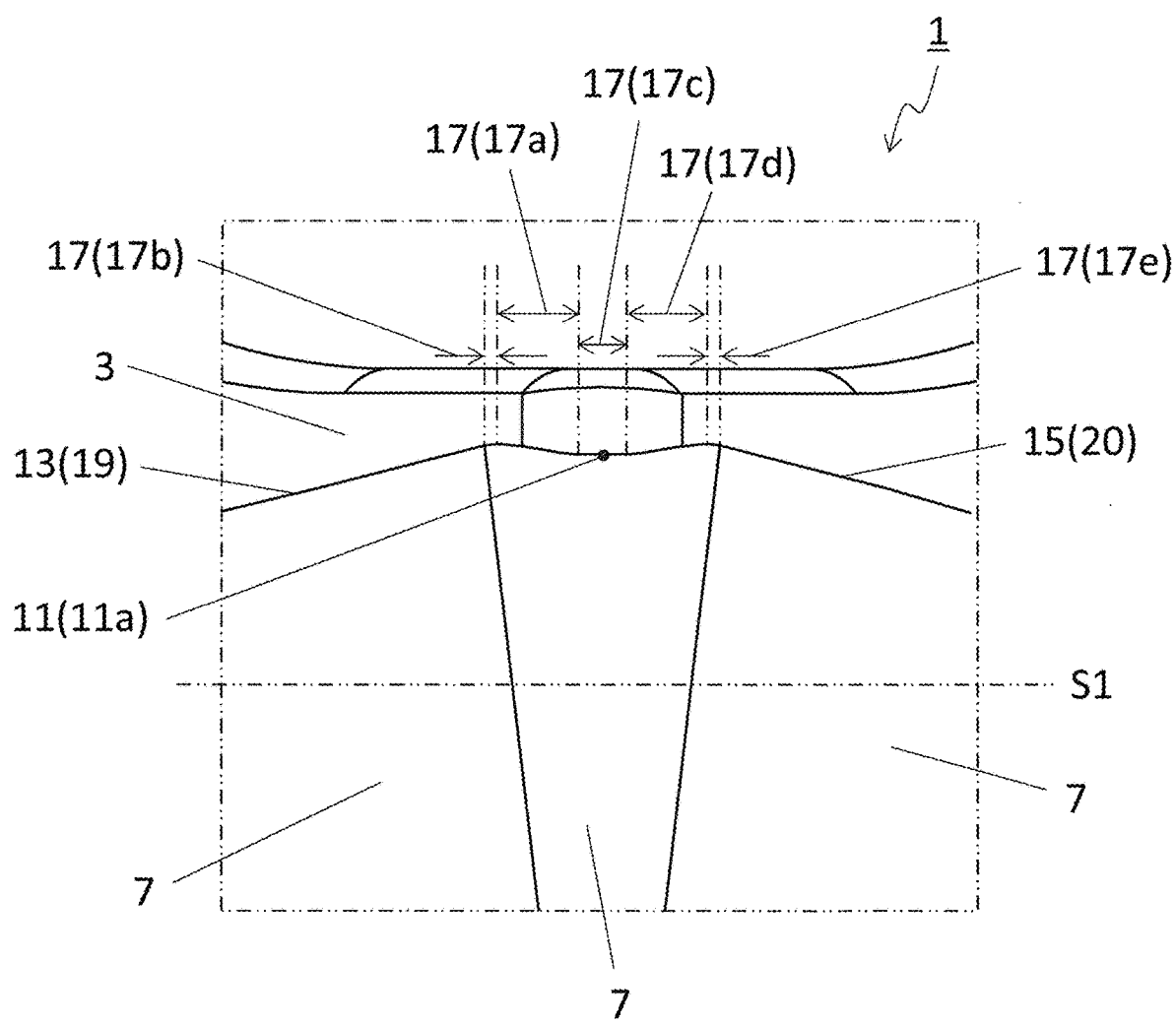
FIG. 6 is a side view of the cutting insert illustrated in FIG. 4 as viewed from a B2 direction.
Figure 7:
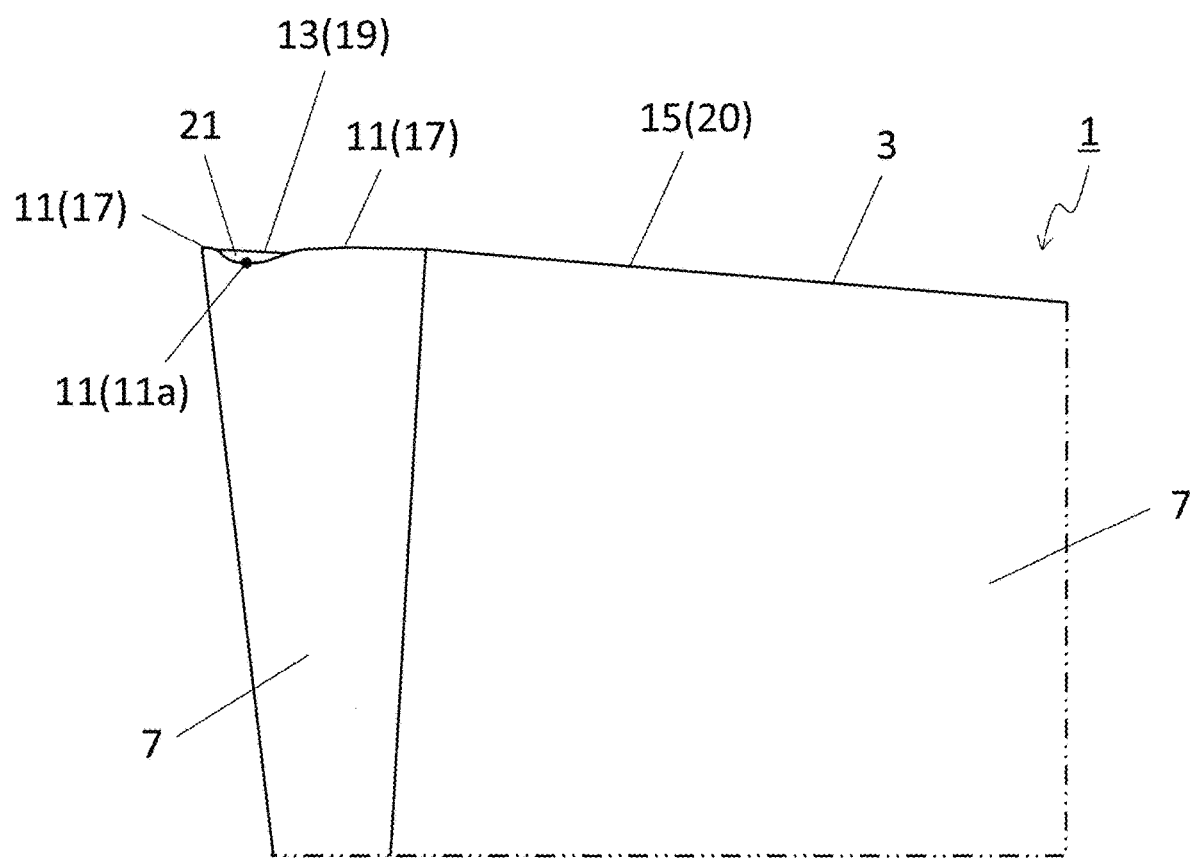
FIG. 7 is a side view of the cutting insert illustrated in FIG. 4 as viewed from a B3 direction.
Figure 8:
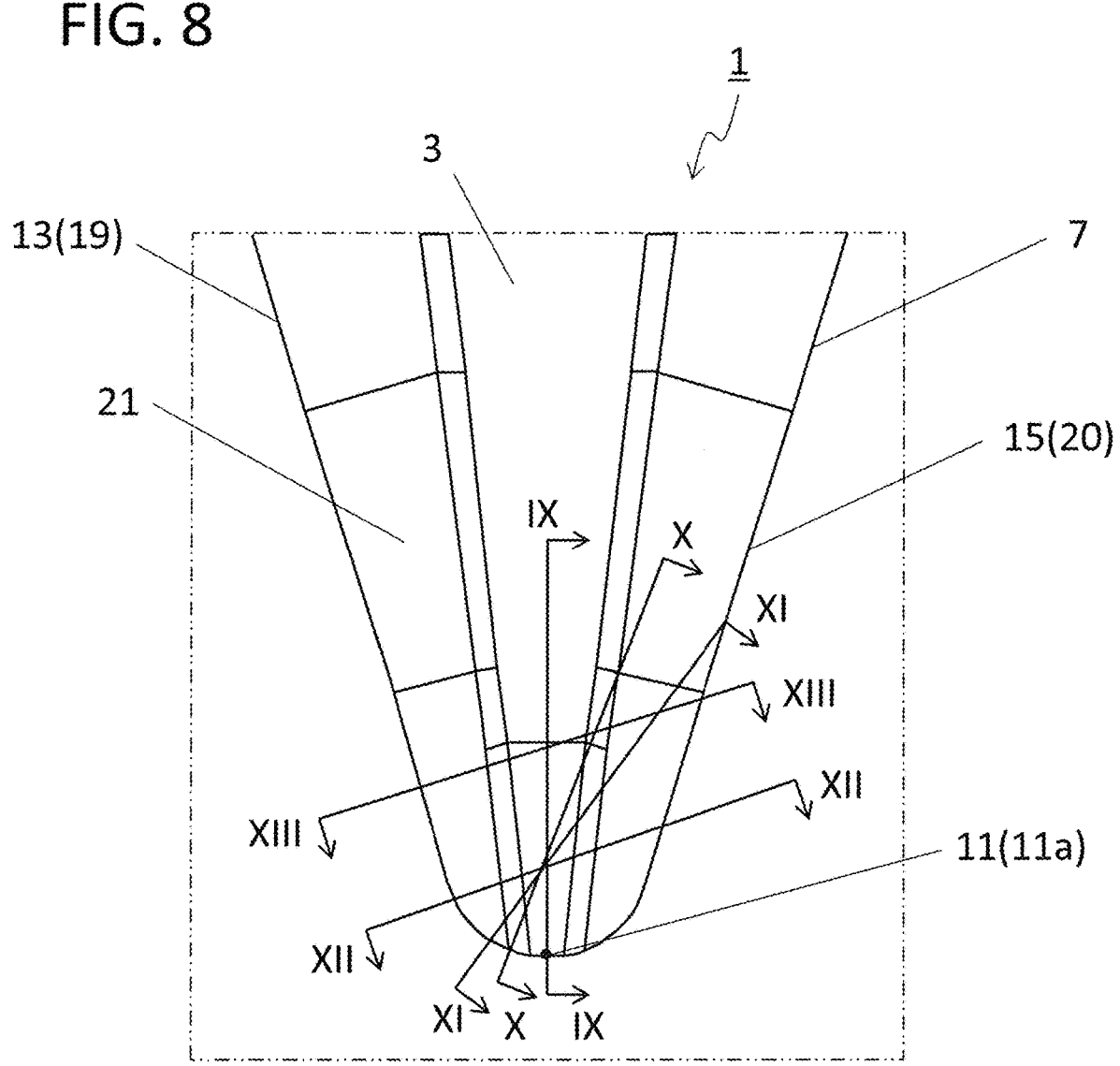
FIG. 8 is an enlarged view identical to that of the region illustrated in FIG. 4.

The first cutting edge 17 may be configured by a plurality of parts as in a non-limiting embodiment illustrated in FIG. 6. For example, the first cutting edge 17 may include a first part 17a. The first part 17a may be located between a midportion 11a of the first corner 11 and the first side 13, and may come closer to a reference plane S1 as going away from the first side 13. An imaginary plane that is located between the upper surface 3 and the lower surface 5 and is orthogonal to the central axis O1 may be the reference plane S1.

The entirety of a part located between the midportion 11a of the first corner 11 and the first side 13 in the first cutting edge 17 may be the first part 17a, or alternatively, only the part located between the midportion 11a of the first corner 11 and the first side 13 may be the first part 17a.

Figure 4:
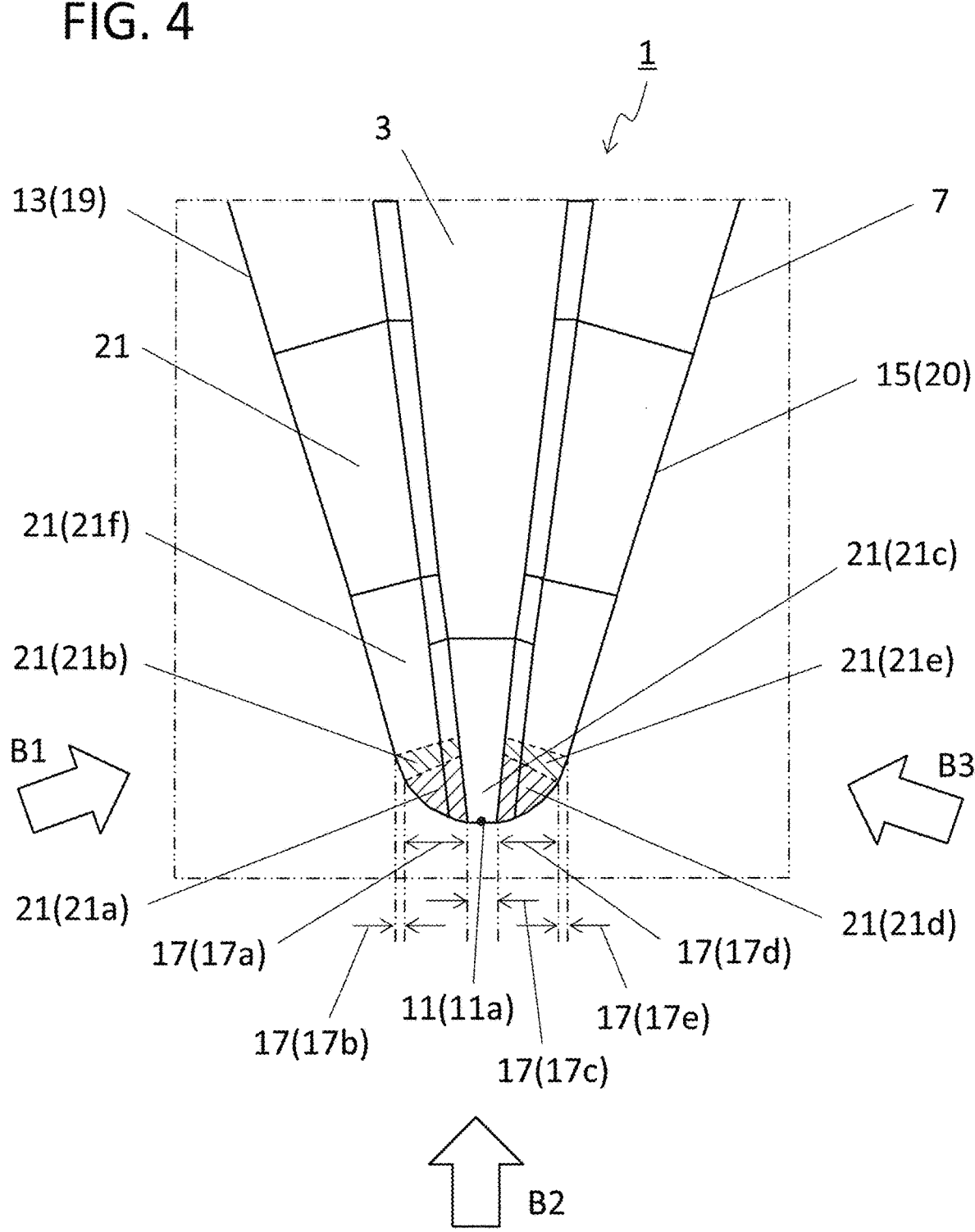
FIG. 4 is an enlarged view of a region A2 illustrated in FIG. 3.

The upper surface 3 may further include a rake surface 21 located along the cutting edge 9 as in the non-limiting embodiment illustrated in FIG. 4. The rake surface 21 may serve as a surface where chips flow during a cutting process of a workpiece. If the upper surface 3 includes the rake surface 21, the lateral surface 7 may include a flank surface.

The rake surface 21 may connect to the cutting edge 9, but is not limited to a configuration where the rake surface 21 strictly connects to the cutting edge 9. For example, a narrow region, which is generally referred to as a land surface, may be located between the rake surface 21 and the cutting edge 9.

The rake surface 21 may come closer to the reference plane S1 as going away from the cutting edge 9. In other words, the rake surface 21 may be inclined downward as going away from the cutting edge 9. An inclination angle of the rake surface 21 with respect to the reference plane S1 may be a rake angle θ. The magnitude of the rake angle θ is not limited to a specific value. For example, the rake angle θ is settable to 3-25°. The rake angle θ may be evaluated in, for example, the following procedure.

Firstly, a measuring object point in the cutting edge 9 may be determined. Then, a cross section may be indicated which is orthogonal to the cutting edge 9 at the object point in a top view. Because the reference plane S1 and the rake surface 21 are individually indicated by a line in the cross section, an angle at which these lines intersect with each other may be measured. This angle may be the rake angle θ. If the rake surface 21 is not flat, the rake surface 21 may be indicated by a curvilinear shape in the above cross section. In this case, a maximum value of an inclination angle of the rake surface 21 with respect to the reference plane S1 in the cross section may be the rake angle θ.

The rake surface 21 may include a first region 21a located along the first part 17a. A rake angle θ in the first region 21a may become smaller as coming closer to the midportion 11a of the first corner 11. A width of the insert 1 in a direction orthogonal to a corner bisector of the first corner 11 may become smaller as coming closer to the midportion 11a of the first corner 11 in a top view. Accordingly, strength of the insert 1 may tend to decrease as coming closer to the midportion 11a of the first corner 11.

If the rake angle θ in the first region 21a becomes smaller as coming closer to the midportion 11a of the first corner 11, the insert 1 may tend to have a larger thickness as coming closer to the midportion 11a of the first corner 11. It is therefore possible to enhance durability of the insert 1 at the midportion 11a of the first corner 11. This consequently may lead to high efficiency of the cutting process.

Figure 9:
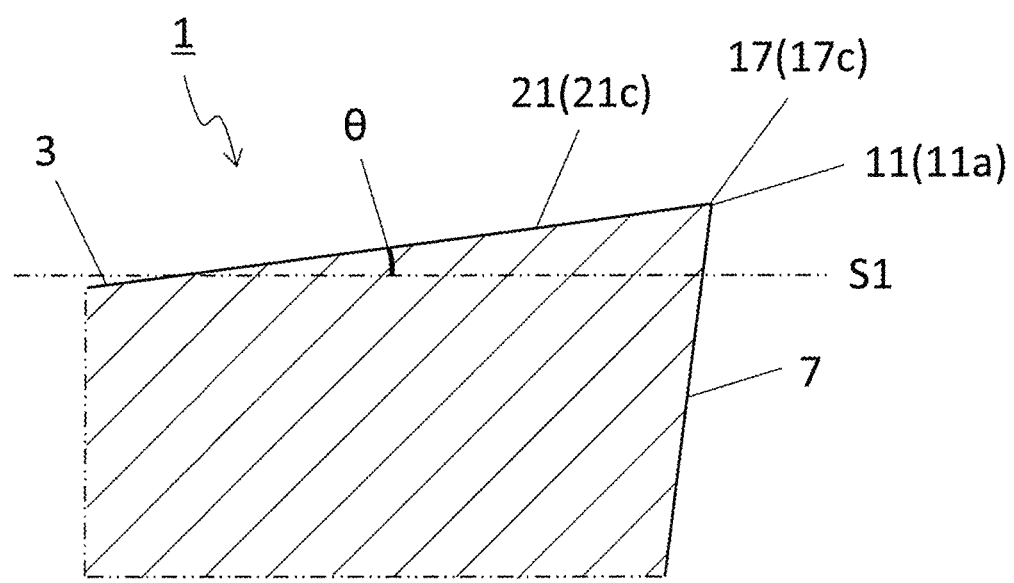
FIG. 9 is a sectional view taken along the line IX-IX in the cutting insert illustrated in FIG. 8.

The following procedure is usable to evaluate whether or not the rake angle θ in the first region 21a becomes smaller as coming closer to the midportion 11a of the first corner 11. Firstly, four points located at equal intervals in the first part 17a may be set as a measuring object point. Cross sections respectively orthogonal to the cutting edge 9 at these four object points in a top view may be indicated as in a non-limiting embodiment illustrated in FIG. 9. Then, a rake angle θ may be measured in each of these four cross sections.

A comparison may be made among the rake angles θ in these four cross sections. If the rake angle θ becomes smaller as coming closer to the midportion 11a of the first corner 11, a part of the rake surface 21 located along a portion surrounded by these four object points in the first part 17a may be the first region 21a. Consequently, it can be evaluated that the rake angles θ in the first region 21a becomes smaller as coming closer to the midportion 11a of the first corner 11. A difference between a minimum value and a maximum value of the rake angle θ in the first region 21a may be, for example, 2° or more.

The first cutting edge 17 may further include, in addition to the first part 17a, at least one of a second part 17b, a third part 17c, a fourth part 17d and a fifth part 17e which are described in detail below. That is, the first cutting edge 17 may include any one of the second part 17b, the third part 17c, the fourth part 17d and the fifth part 17e, or alternatively may include two or more of the second part 17b, the third part 17c, the fourth part 17d and the fifth part 17e.

The rake surface 21 may further include, in addition to the first region 21a, at least one of a second region 21b, a third region 21c, a fourth region 21d, a fifth region 21e and a sixth region 21f which are described in detail below. That is, the rake surface 21 may include any one of the second region 21b, the third region 21c, the fourth region 21d, the fifth region 21e and the sixth region 21f, or alternatively may include two or more of the second region 21b, the third region 21c, the fourth region 21d, the fifth region 21e and the sixth region 21f.

Figure 10:
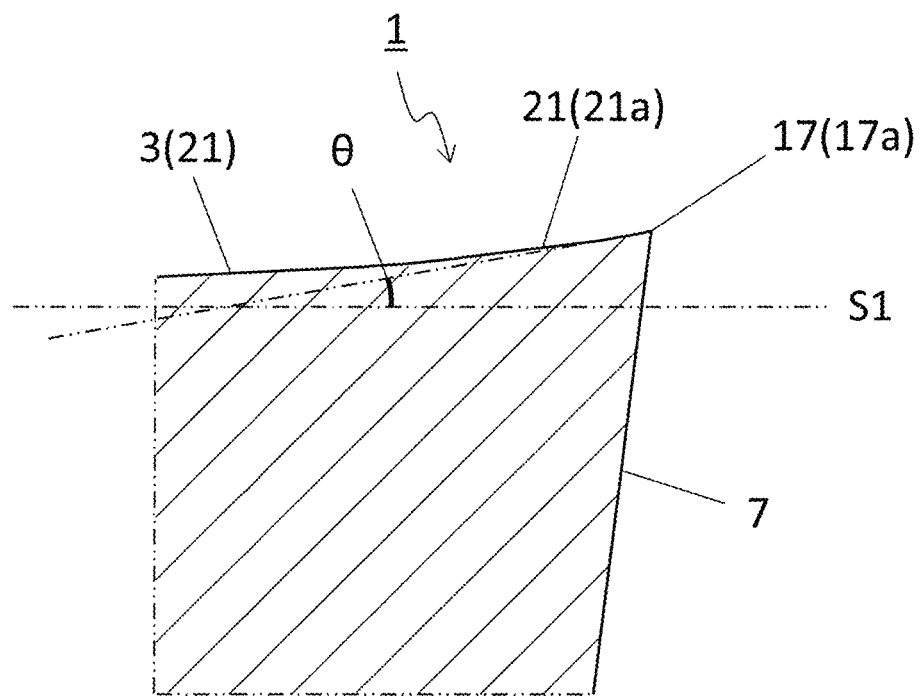
FIG. 10 is a sectional view taken along the line X-X in the cutting insert illustrated in FIG. 8.

The second part 17b may be located between the first part 17a and the first side 13. The second part 17b may be located more away from the reference plane S1 as going away from the first side 13. The second region 21b may be located along the second part 17b. As in a non-limiting embodiment illustrated in FIG. 10, a rake angle θ in the second region 21b may be evaluated. The rake angle θ in the second region 21b may increase as coming closer to the first part 17a.

The second part 17b located closer to the first side 13 than the first part 17a is usable as a so-called flat cutting edge. If the rake angle θ in the second region 21b becomes larger as coming closer to the first part 17a, cutting performance in the second part 17b can be enhanced. It is therefore possible to improve surface precision of a machined surface in a workpiece. In other words, it is possible to decrease surface roughness of the machined surface.

Similarly to the evaluation of the rake angle θ in the first region 21a, an evaluation may be made as to whether or not the rake angle θ in the second region 21b becomes larger as coming closer to the first part 17a. That is, the rake angle θ may be evaluated by setting four points located at equal intervals as a measurement object point. A difference between a minimum value and a maximum value of the rake angles θ in the second region 21b may be, for example, 0.1° or more.

In cases where the second cutting edge 19 is located more away from the reference plane S1 as coming closer to the first cutting edge 17 as in the non-limiting embodiment illustrated in FIG. 6, durability of the cutting edge 9 can be enhanced if the second part 17b is located more away from the reference plane S1 as going away from the first side 13.

This is because a change in an extending direction of the cutting edge 9 becomes small in the vicinity of a boundary between the first cutting edge 17 and the second cutting edge 19. A direction of cutting load applied to the individual parts of the cutting edge 9 may be less likely to change rapidly under a small change in the extending direction of the cutting edge 9. Although the cutting load tends to be centralized in the vicinity of the boundary between the first cutting edge 17 and the second cutting edge 19, the cutting edge 9 having the above configuration may be less prone to rapid change in the direction of cutting load, thus leading to the enhanced durability of the cutting edge 9.

Figure 11:
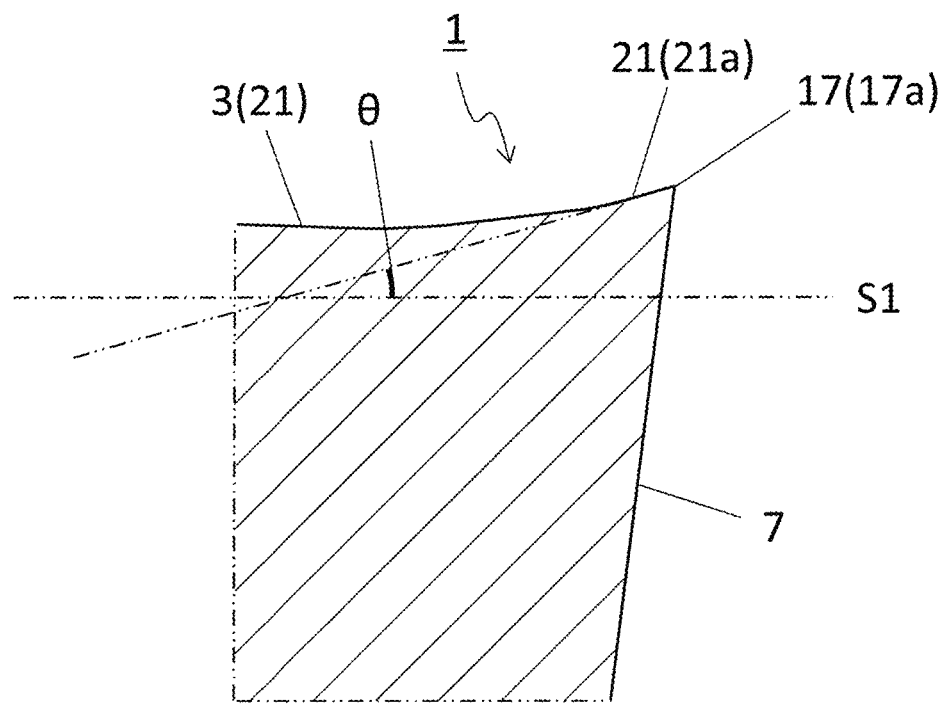
FIG. 11 is a sectional view taken along the line XI-XI in the cutting insert illustrated in FIG. 8.

The third part 17c may be located so as to include the midportion 11a of the first corner 11. One of two ends of the third part 17c may be located at the midportion 11a of the first corner 11. Alternatively, the midportion 11a of the first corner 11 may be located between these two ends of the third part 17c. The third region 21c may be located along the third part 17c. A rake angle θ in the third region 21c may be evaluated as in a non-limiting embodiment illustrated in FIG. 11.

The rake angle θ in the third region 21c may be smaller than the rake angle θ in the first region 21a. More specifically, a minimum value of the rake angle θ in the third region 21c may be smaller than a minimum value of the rake angle θ in the first region 21a.

The strength of the insert 1 may tend to decrease as coming closer to the midportion 11a of the first corner 11 as described above. If the rake angle θ in the third region 21c located along the third part 17c is smaller than the rake angle θ in the first region 21a, it is possible to enhance the strength of the insert 1 in the vicinity of the midportion 11a of the first corner 11. It is therefore possible to further enhance the durability of the insert 1 at the midportion 11a of the first corner 11. This consequently may lead to higher efficiency of the cutting process.

In cases where the rake surface 21 includes the third region 21c, the third region 21c may be a curved surface or may be flat. If the third region 21c is flat, it is possible to further enhance the strength of the insert 1 in the vicinity of the midportion 11a of the first corner 11. This consequently may lead to further enhanced durability of the insert 1 at the midportion 11a of the first corner 11.

Figure 12:
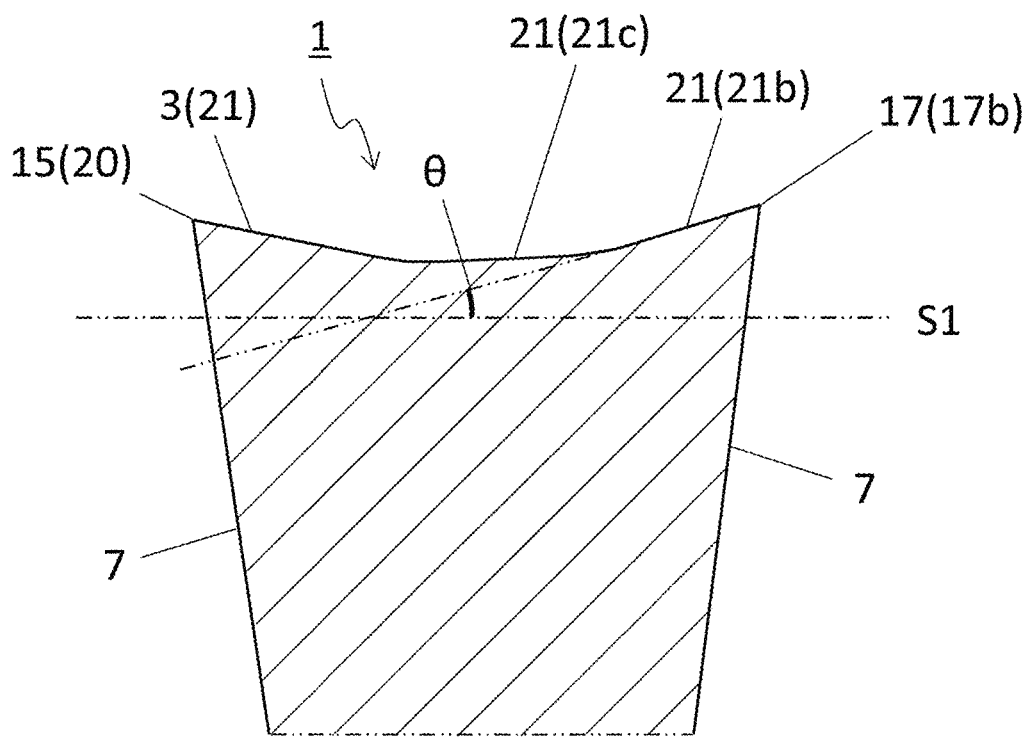
FIG. 12 is a sectional view taken along the line XII-XII in the cutting insert illustrated in FIG. 8.

The fourth part 17d may be located between the midportion 11a of the first corner 11 and the second side 15. The fourth part 17d may come closer to the reference plane S1 as going away from the second side 15. The fourth region 21d may be located along the fourth part 17d. A rake angle θ in the fourth region 21d may be evaluated as in a non-limiting embodiment illustrated in FIG. 12. The rake angle θ in the fourth region 21d may become smaller as coming closer to the midportion 11a of the first corner 11.

Versatility of the insert 1 can be enhanced if the insert 1 further includes the fourth part 17d and the fourth region 21d described above. For example, even in a cutting process using the third cutting edge 20 and the fourth part 17d, the midportion 11a of the first corner 11 in the insert 1 may have enhanced durability, and high efficiency of the cutting process is attainable as in a cutting process using the second cutting edge 19 and the first part 17a. The insert 1 is therefore usable in both so-called right-hand and left-hand cutting processes.

Figure 13:
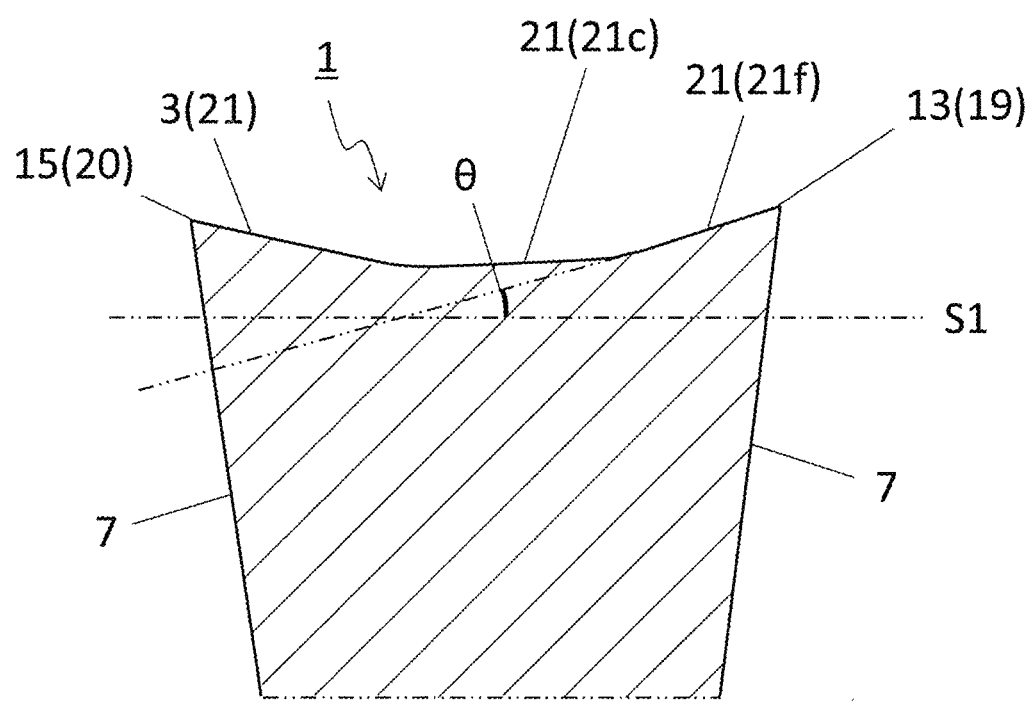
FIG. 13 is a sectional view taken along the line XIII-XIII in the cutting insert illustrated in FIG. 8.

The fifth part 17e may be located between the fourth part 17d and the second side 15. The fifth part 17e may be located more away from the reference plane S1 as going away from the second side 15. The fifth region 21e may be located along the fifth part 17e. A rake angle θ in the fifth region 21e may be evaluated as in a non-limiting embodiment illustrated in FIG. 13. The rake angle θ in the fifth region 21e may become larger as coming closer to the fourth part 17d.

Similarly to the second part 17b, the fifth part 17e located closer to the second side 15 than the fourth part 17d is usable as the so-called flat cutting edge. If the rake angle θ in the fifth region 21e becomes larger as coming closer to the fourth part 17d, cutting performance in the fifth part 17e can be enhanced. It is therefore possible to improve surface precision of a machined surface in a workpiece. In other words, it is possible to decrease surface roughness of the machined surface.

In cases where the insert 1 includes both the second part 17b and the fifth part 17e described above, surface precision of a machined surface in a workpiece can be improved in both the right-hand and left-hand cutting processes.

The first region 21a may be a curved surface or may be flat. If the first region 21a is flat, it is possible to further enhance the strength of the insert 1 in the vicinity of the first part 17a. This consequently may lead to further enhanced durability of the insert 1.

The sixth region 21f may be located along the second cutting edge 19. The sixth region 21f may be a curved surface or may be flat. If the sixth region 21f is flat, chips generated by the second cutting edge 19 may tend to pass smoothly on the sixth region 21f, thereby improving chip discharge performance.

The first region 21a and the sixth region 21f may be flat and located on the same flat surface. In this case, chips generated at the first part 17a may tend to smoothly pass from the first region 21a to the sixth region 21f. Because the chips generated at the first part 17a tend to have a smaller thickness than chips generated at the sixth region 21f, a chip flow may tend to become unstable. It is however possible to further improve the chip discharge performance because the chips generated at the first part 17a tend to smoothly pass from the first region 21a to the sixth region 21f.

The insert 1 may include a through hole 23 that opens into the upper surface 3 and the lower surface 5 as in the non-limiting embodiment illustrated in FIG. 1. A central axis of the through hole 23 may coincide with the central axis O1 of the insert 1. The through hole 23 is usable for inserting, for example, a screw when fixing the insert 1 to a holder. For example, a clamping member may be used instead of the screw when fixing the insert 1 to the holder.

The insert 1 is not limited to a specific size. For example, a length of one side of the upper surface 3 having the polygonal shape is settable to approximately 10-25 mm. A height from the upper surface 3 to the lower surface 5, in other words, a height in a direction along the central axis O1 is settable to approximately 2-5 mm.

For example, cemented carbide and cermet are usable as a material of the insert 1. Examples of composition of the cemented carbide may include WC—Co, WC—TiC—Co and WC—TiC—TaC—Co, in which WC, TiC and TaC may be hard particles and Co may be a binding phase.

The cermet may be a sintered composite material obtained by compositing metal into a ceramic component. Examples of the cermet may include titanium compounds composed mainly of titanium carbide (TiC) or titanium nitride (TiN). It should be clear that the material of the insert 1 is not limited to the above composition.

The surface of the insert 1 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Cutting Tools>

A cutting tool 101 in a non-limiting embodiment of the present disclosure may be described below with reference to the drawings.

Figure 14:
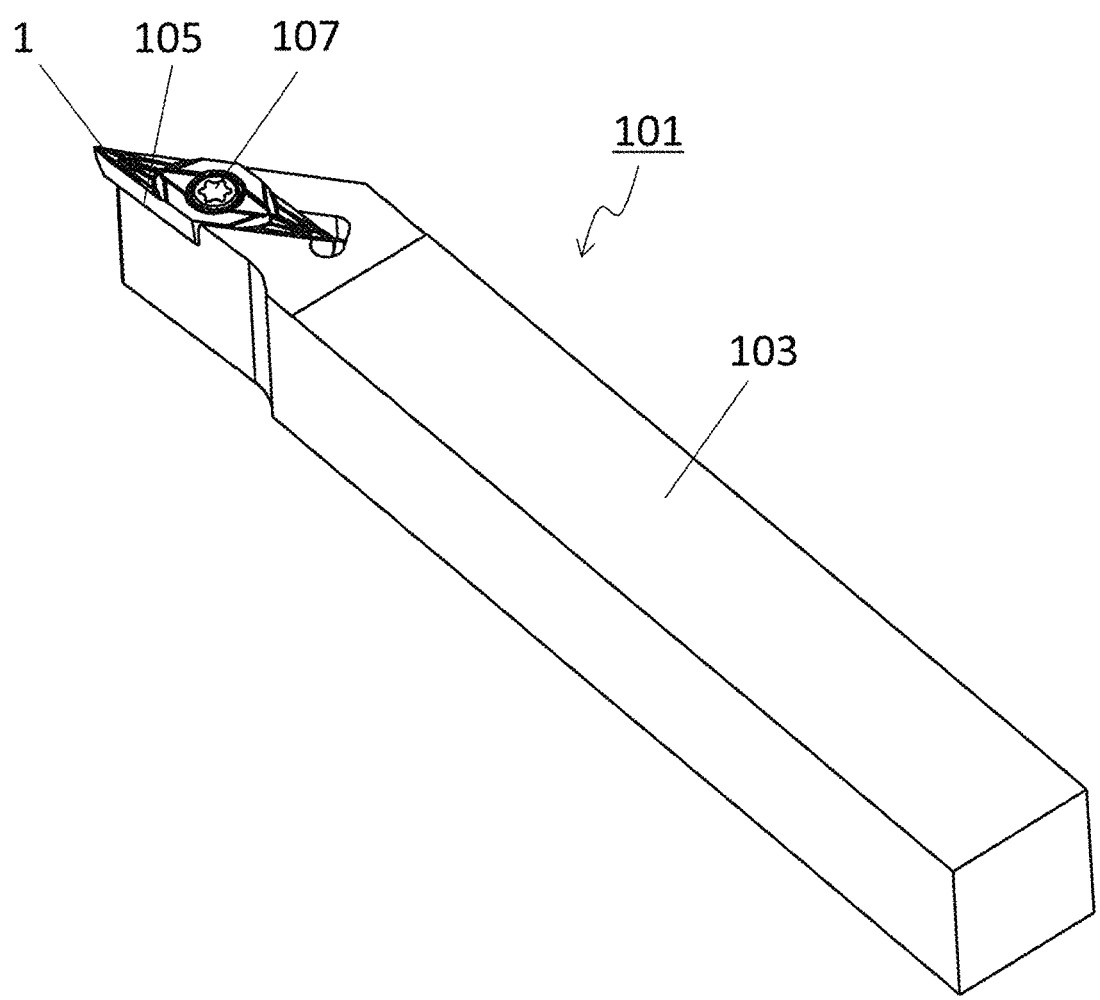
FIG. 14 is a perspective view illustrating a cutting tool in a non-limiting embodiment.
Figure 15:
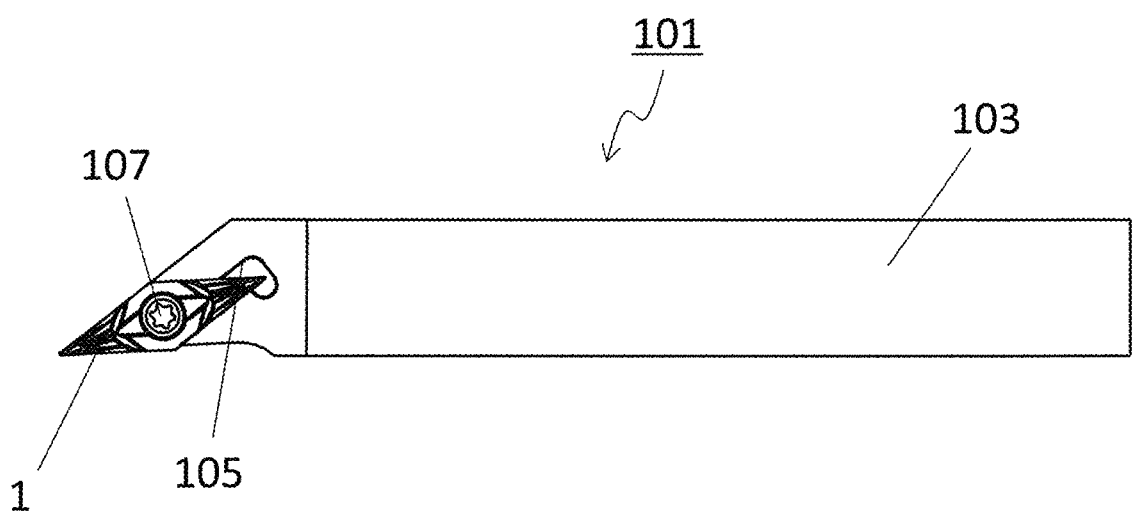
FIG. 15 is a side view of the cutting tool illustrated in FIG. 14.

The cutting tool 101 may include a holder 105 extending from a first end 105a to a second end 105b as in a non-limiting embodiment illustrated in FIGS. 14 and 15. The holder 105 may include a pocket 103 (insert pocket) located on a side of the first end 105a. The cutting tool 101 may include the insert 1 located in the pocket 103. The insert 1 of the cutting tool 101 may be attached so that at least a part of the cutting edge 9 is protruded from the first end 105a of the holder 105.

The holder 105 may have a long and narrow bar shape. The pocket 103 may be located on a side of the first end 105a of the holder 105. The pocket 103 may be a part that permits attachment of the insert 1, and may open into an end surface on the side of the first end 105a in the holder 105. If the pocket 103 also opens into a lateral surface of the holder 105, it may be easy to attach the insert 1.

The pocket 103 may include a seating surface approximately parallel to a lower surface of the holder 105, and a constraining lateral surface inclined with respect to the seating surface.

The insert 1 may be located in the pocket 103. The lower surface 5 of the insert 1 may be in direct contact with the pocket 103. Alternatively, a sheet may be held between the insert 1 and the pocket 103.

The insert 1 may be attached to the holder 105 with a screw 107 as in the non-limiting embodiment illustrated in FIG. 14. For example, the holder may include a screw hole. The insert 1 may be constrained in the pocket 103 by insertion of the screw 107 into the through hole 23 of the insert 1, and by fixation of the screw 107 in the screw hole.

Alternatively, the insert 1 may be fixed to the holder 105 by a clamping member. Specifically, a head of the clamping member may be pressed against an inner wall of the through hole of the insert 1, so that the insert 1 can be constrained in the pocket 103.

For example, steel and cast iron may be used as a material of the holder 105. Of these materials, the use of steel may particularly contribute to enhancing toughness of the holder 105.

A non-limiting embodiment may illustrate a cutting tool used in a so-called turning process. Examples of the turning process may include internal diameter machining, external diameter machining and end face machining. The cutting tool is not limited to ones which are used for the turning process. For example, the insert 1 may be used for a cutting tool used in a milling process.

<Methods for Manufacturing Machined Product>

A method for manufacturing a machined product in a non-limiting embodiment of the present disclosure may be described below with reference to the drawings.

The machined product 203 may be manufactured by carrying out a cutting process of a workpiece 201. The methods for manufacturing the machined product 203 in the embodiment may include the following steps:

(1) rotating the workpiece 201;
(2) bringing the cutting tool 101 represented by the above embodiment into contact with the workpiece 201 being rotated; and
(3) moving the cutting tool 101 away from the workpiece 201.

Figure 16:
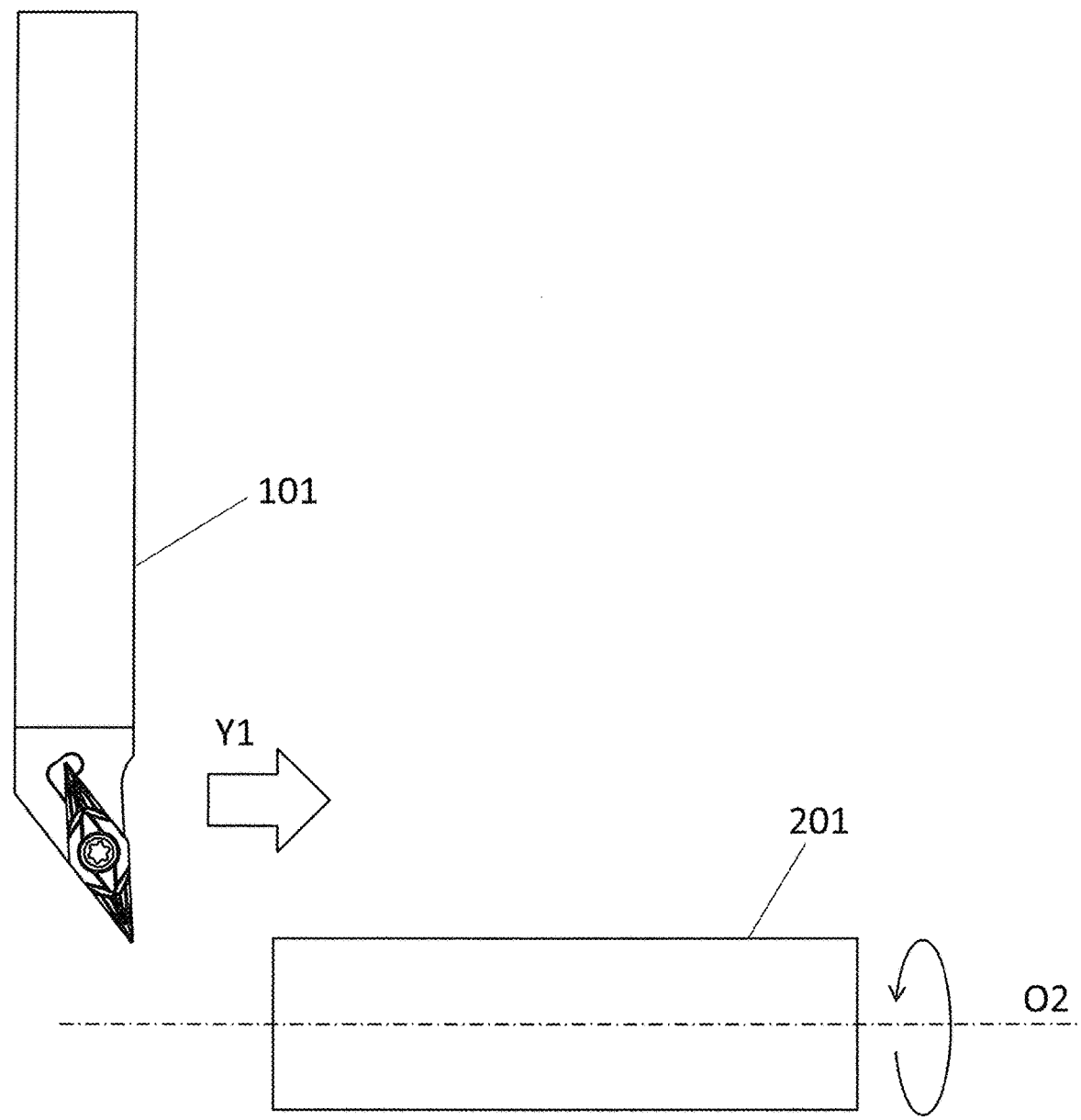
FIG. 16 is a schematic diagram illustrating one of steps in a method for manufacturing a machined product in a non-limiting embodiment.

More specifically, firstly, the workpiece 201 may be rotated around an axis O2, and the cutting tool 101 may be relatively brought near the workpiece 201 as in a non-limiting embodiment illustrated in FIG. 16. Subsequently, the workpiece 201 may be cut out by bringing the cutting edge 9 of the cutting tool 101 into contact with the workpiece 201 as in a non-limiting embodiment illustrated in FIG. 17. Thereafter, the cutting tool 101 may be relatively moved away from the workpiece 201 as in a non-limiting embodiment illustrated in FIG. 18.

As in the non-limiting embodiment illustrated in FIG. 16, the cutting tool 101 may be brought near the workpiece 201 by moving the cutting tool 101 in a Y1 direction in a state where the axis O2 is fixed and the workpiece 201 is rotated.

Figure 17:
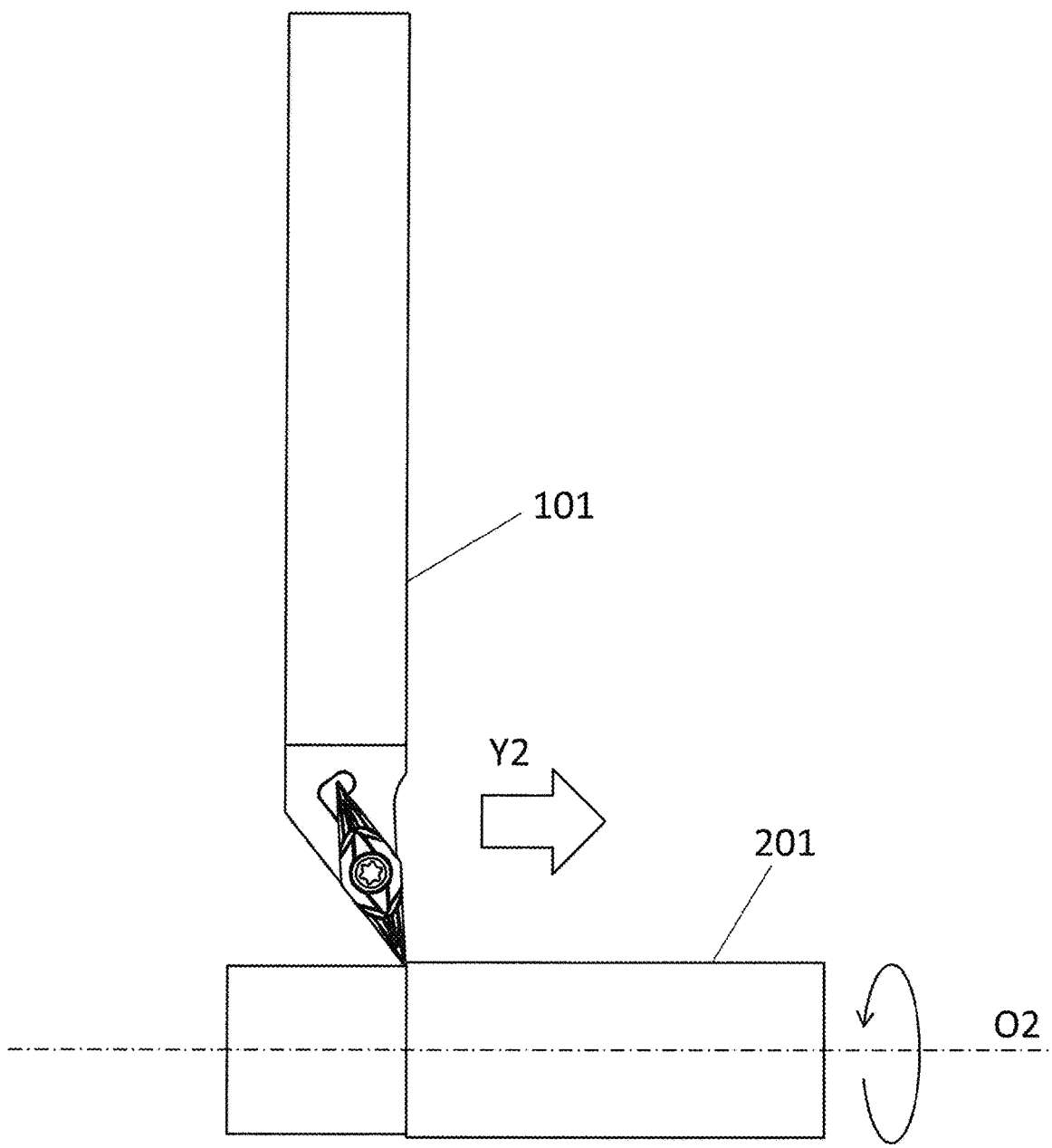
FIG. 17 is a schematic diagram illustrating one of the steps in the method for manufacturing a machined product in the non-limiting embodiment.

As in the non-limiting embodiment illustrated in FIG. 17, the workpiece 201 may be cut out by moving the cutting tool 101 in a Y2 direction in a state where at least a portion of a part used as the cutting edge 9 in the insert 1 is in contact with the workpiece 201 being rotated.

Figure 18:
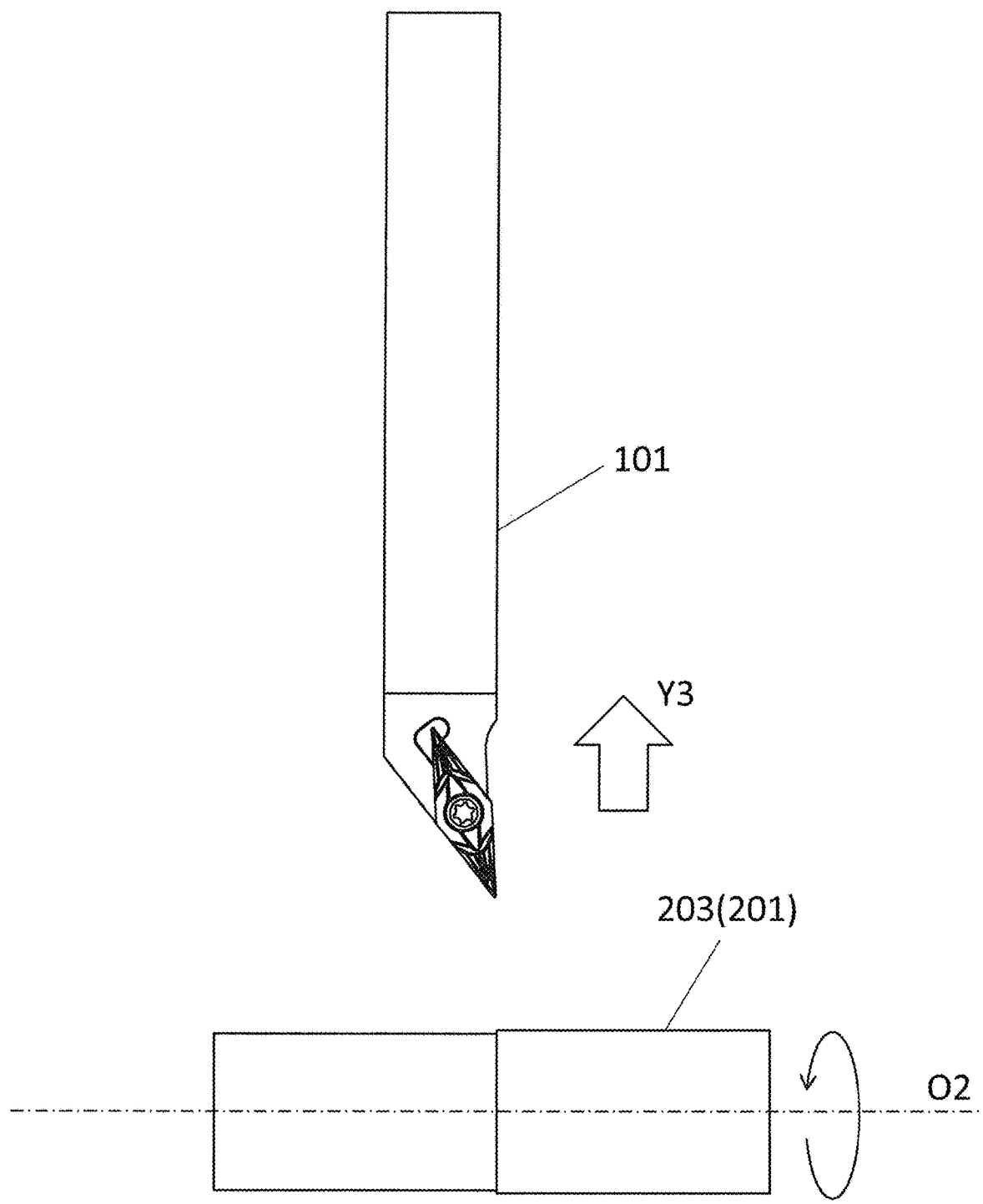
FIG. 18 is a schematic diagram illustrating one of the steps in the method for manufacturing a machined product in the non-limiting embodiment.

As in the non-limiting embodiment illustrated in FIG. 18, the cutting tool 101 may be moved away from the workpiece 201 by moving the cutting tool 101 in a Y3 direction in a state where the workpiece 201 is rotated.

The cutting tool 101 may be brought into contact with the workpiece 201, or the cutting tool 101 may be moved away from the workpiece 201 by moving the cutting tool 101 in the individual steps. However, it is not intended to limit to this embodiment.

For example, the workpiece 201 may be brought near the cutting tool 101 in the step (1). Similarly, the workpiece 201 may be moved away from the cutting tool 101 in the step (3). If it is desired to continue the cutting process, the step of bringing at least a part of the cutting edge 9 of the insert 1 into contact with different portions of the workpiece 201 may be repeated while keeping the workpiece 201 rotated.

Representative examples of material of the workpiece 201 may include hardened steel, carbon steel, alloy steel, stainless steel, cast iron or nonferrous metals.

The invention claimed is:

1. A cutting insert, comprising:
an upper surface comprising
a first corner having a convex curvilinear shape, and
a first side and a second side each connecting to the first corner;
a lower surface located on a side opposite to the upper surface;
a lateral surface located between the upper surface and the lower surface; and
a cutting edge located on an intersection of the upper surface and the lateral surface, wherein
an imaginary straight line passing through a center of the upper surface and a center of the lower surface is a central axis,
an imaginary plane, which is located between the upper surface and the lower surface and is orthogonal to the central axis, is a reference plane,
the cutting edge comprises
a first cutting edge located on the first corner, and
a second cutting edge located on the first side,
the first cutting edge comprises
a first part which is located between a midportion of the first corner and the first side, and which comes closer to the reference plane as going away from the first side, and
a third part located so as to include the midportion of the first corner,
the upper surface further comprises a rake surface located along the cutting edge,
the rake surface comprises
a first region located along the first part, and
a third region located along the third part,
a rake angle in the first region becomes smaller as coming closer to the midportion of the first corner, and
a rake angle in the third region is smaller than the rake angle in the first region.

2. The cutting insert according to claim 1, wherein
the first cutting edge further comprises a second part which is located between the first part and the first side, and which is located more away from the reference plane as going away from the first side,
the rake surface further comprises a second region located along the second part, and
a rake angle in the second region becomes larger as coming closer to the first part.

3. The cutting insert according to claim 1, wherein the third region is flat.

4. The cutting insert according to claim 1, wherein the first cutting edge further comprises a fourth part which is located between the midportion of the first corner and the second side, and which comes closer to the reference plane as going away from the second side,
the rake surface further comprises a fourth region located along the fourth part, and
a rake angle in the fourth region becomes smaller as coming closer to the midportion of the first corner.

5. The cutting insert according to claim 4, wherein the first cutting edge further comprises a fifth part which is located between the fourth part and the second side, and which is located more away from the reference plane as going away from the second side,
the rake surface further comprises a fifth region located along the fifth part, and
a rake angle in the fifth region becomes larger as coming closer to the fourth part.

6. The cutting insert according to claim 1, wherein the first region is flat.

7. The cutting insert according to claim 6, wherein the rake surface further comprises a sixth region that is flat and located along the second cutting edge, and
the first region and the sixth region are located on one flat surface.

8. A cutting tool, comprising:
a holder having a bar shape extended from a first end toward a second end, the holder comprising a pocket located at the first end; and
the cutting insert according to claim 1, the cutting insert being located in the pocket.

9. A method for manufacturing a machined product, comprising:
rotating a workpiece;
bringing the cutting tool according to claim 8 into contact with the workpiece being rotated; and
moving the cutting tool away from the workpiece.

10. A cutting insert, comprising:
an upper surface comprising
a first corner having a convex curvilinear shape, and
a first side and a second side each connecting to the first corner;
a lower surface located on a side opposite to the upper surface;
a lateral surface located between the upper surface and the lower surface; and
a cutting edge located on an intersection of the upper surface and the lateral surface, wherein
an imaginary straight line passing through a center of the upper surface and a center of the lower surface is a central axis,
an imaginary plane, which is located between the upper surface and the lower surface and is orthogonal to the central axis, is a reference plane,
the cutting edge comprises
a first cutting edge located on the first corner, and
a second cutting edge located on the first side,
the first cutting edge comprises
a first part which is located between a midportion of the first corner and the first side, and which comes closer to the reference plane as going away from the first side,
a fourth part which is located between the midportion of the first corner and the second side, and which comes closer to the reference plane as going away from the second side, and
a fifth part which is located between the fourth part and the second side, and which is located more away from the reference plane as going away from the second side,
the upper surface further comprises a rake surface located along the cutting edge,
the rake surface comprises
a first region located along the first part,
a fourth region located along the fourth part, and
a fifth region located along the fifth part,
a rake angle in the first region becomes smaller as coming closer to the midportion of the first corner,
a rake angle in the fourth region becomes smaller as coming closer to the midportion of the first corner, and
a rake angle in the fifth region becomes larger as coming closer to the fourth part.

11. The cutting insert according to claim 10, wherein the first cutting edge further comprises a second part which is located between the first part and the first side, and which is located more away from the reference plane as going away from the first side,
the rake surface further comprises a second region located along the second part, and
a rake angle in the second region becomes larger as coming closer to the first part.

12. The cutting insert according to claim 10, wherein the first cutting edge further comprises a third part located so as to include the midportion of the first corner,
the rake surface further comprises a third region located along the third part, and
a rake angle in the third region is smaller than the rake angle in the first region.

13. The cutting insert according to claim 10, wherein the first region is flat.

14. The cutting insert according to claim 13, wherein the rake surface further comprises a sixth region that is flat and located along the second cutting edge, and
the first region and the sixth region are located on one flat surface.

15. A cutting insert, comprising:
an upper surface comprising
a first corner having a convex curvilinear shape, and
a first side and a second side each connecting to the first corner;
a lower surface located on a side opposite to the upper surface;
a lateral surface located between the upper surface and the lower surface; and
a cutting edge located on an intersection of the upper surface and the lateral surface, wherein
an imaginary straight line passing through a center of the upper surface and a center of the lower surface is a central axis,
an imaginary plane, which is located between the upper surface and the lower surface and is orthogonal to the central axis, is a reference plane,
the cutting edge comprises
a first cutting edge located on the first corner, and
a second cutting edge located on the first side,
the first cutting edge comprises a first part which is located between a midportion of the first corner and the first side, and which comes closer to the reference plane as going away from the first side,
the upper surface further comprises a rake surface located along the cutting edge, the rake surface comprises a first region located along the first part, wherein the first region is flat, and a rake angle in the first region becomes smaller as coming closer to the midportion of the first corner.

16. The cutting insert according to claim 15, wherein the first cutting edge further comprises a second part which is located between the first part and the first side, and which is located more away from the reference plane as going away from the first side, the rake surface further comprises a second region located along the second part, and a rake angle in the second region becomes larger as coming closer to the first part.

17. The cutting insert according to claim 15, wherein the first cutting edge further comprises a third part located so as to include the midportion of the first corner, the rake surface further comprises a third region located along the third part, and a rake angle in the third region is smaller than the rake angle in the first region.

18. The cutting insert according to claim 15, wherein the first cutting edge further comprises a fourth part which is located between the midportion of the first corner and the second side, and which comes closer to the reference plane as going away from the second side, the rake surface further comprises a fourth region located along the fourth part, and a rake angle in the fourth region becomes smaller as coming closer to the midportion of the first corner.

19. The cutting insert according to claim 18, wherein the first cutting edge further comprises a fifth part which is located between the fourth part and the second side, and which is located more away from the reference plane as going away from the second side, the rake surface further comprises a fifth region located along the fifth part, and a rake angle in the fifth region becomes larger as coming closer to the fourth part.

\* \* \* \* \*